Figure 1:
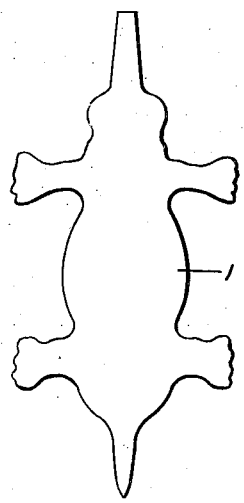

May 18, 1948.  C. SAINT-MLEUX  2,441,905
MANUFACTURE OF SEAMLESS HOLLOW ARTICLES
FROM NATURAL OR SYNTHETIC RUBBER
Filed July 11, 1945

COAGULATING AGENT    LATEX

INVENTOR
CHARLES SAINT-MLEUX
BY Stevens and Davis
ATTORNEYS

Patented May 18, 1948

2,441,905

UNITED STATES PATENT OFFICE 2,441,905

MANUFACTURE OF SEAMLESS HOLLOW ARTICLES FROM NATURAL OR SYNTHETIC RUBBER

Charles Saint-Mleux, Carcassonne, France, assignor to Societe Meridionale Du Caoutchouc S O M E C A, Société à Responsabilité Limitée, Carcassonne, France Application July 11, 1945, Serial No. 604,530
In France October 11, 1943

Section 1, Public Law 690, August 8, 1946
Patent expires October 11, 1963

4 Claims. (Cl. 18—58.4)

This invention relates to the manufacture of hollow articles such as pneumatic cushions, hot-water bottles, toys, toy animals and the like from natural or synthetic latex.

It is an object of my invention to provide a method for manufacturing said articles whereby the drawbacks generally arising in prior processes (moulding or making up) are avoided.

When molding the articles with a press it is necessary to operate in two steps; the inner former is removed after the first moulding and the walls are united by means of a new mold, this being a very delicate operation. The articles may also be made up from sheet-rubber or calendered sheet. This method of manufacture requires costly skilled labor and the articles thus produced often leak at the seams.

According to this invention which is related to known methods of manufacture by dipping, I use formers made of a material which is rigid in the dry state but is capable of growing soft, and losing its rigidity upon contact with cold water.

In carrying out my invention, it is only necessary to dip the core or form one or more times (possibly with intermediate dryings) into a dispersion or solution of natural or artificial rubber, then to proceed with usual treatments of the former (particularly drying and vulcanisation), and then to place the former with its coating in contact with cold water to destroy the rigidity of the core or form which is then withdrawn from the article to be formed, as a unit, or by portions. The former is preferably coated with a coagulant before dipping to assist in forming a coating of rubber thereon.

As material suitable for constituting formers the various species of polyvinyl alcohols may be employed. Natural or synthetic rubber may be used in aqueous dispersion or suspension, or solution in organic solvents; these may contain the usual compounding ingredients.

A strong polymerized alcohol containing less than 3 per cent of acetyl groups is insoluble in cold water but swells into an elastic mass therein; it is dissolved by water at a temperature of about 90–95° C.; it may be used in the manufacture of articles having simple shapes such as rectangular cushions without holes; as the former becomes very resilient upon contact with water, it may be withdrawn through the inflation tube for the rubber article and dried to be re-used a number of successive times.

Filling materials and plasticizers may be added to the polyvinyl alcohol; it may be dried by pouring on an endless band, or calendered, etc.

The formers may be produced for instance by cutting them out of polyvinyl alcohol sheets or by pressing into shape or die-casting powdered polyvinyl alcohol.

The following example which has no limitative character will show how this invention may be accomplished.

*Example.*—Out of a sheet of dry polyvinyl alcohol having a suitable thickness, I may cut a template or former with the inner dimensions of a cushion and inflating tube but extending beyond the point where the inflating tube will normally end, in order that the article may be hung by this extension during its manufacture.

The former may be dipped in latex either directly or preferably after passage through a bath of a coagulant for latex; in the latter case, the former is covered with coagulant so that a thick, even deposit of latex is obtained all over the former. The former with its latex deposit may then be dried at about 60° C. in a hot air oven, and vulcanized.

The former can be removed through the narrow pipe after placing the cushion in water, where it was softened by the water. If it is made of strongly polymerized, pure polyvinyl alcohol which swells in water and becomes flexible and resilient, the former can be withdrawn merely by pulling it out. The cushion is then dried at a temperature of 50 to 60° C.

The attached drawing shows, by way of example, the manner of producing a toy animal from latex.

Figure 1 shows a form 1 cut from a rigid sheet of strongly polymerized polyvinyl alcohol containing less than 3 per cent of acetyl groups; the sheet is thick enough so that the form is capable of supporting the weight of wet latex after dipping.

Figure 2:
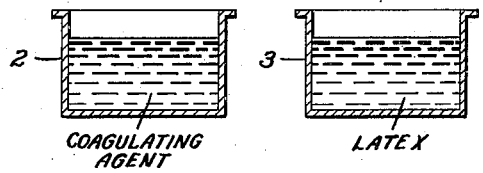

Figure 2 shows how the form 1 is dipped downwardly into a bath of coagulating agent 2 and a bath of latex 3 according to the conventional dipping processes. The first dipping may be made in bath 3, and alternate dippings may be performed a number of times as usual.

Figure 3:
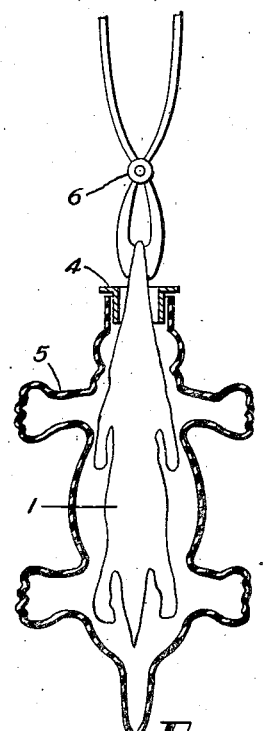

Figure 3 shows how the form is removed after drying and vulcanizing the latex sheet. Cold water or water heated to 60° C. is introduced under a slight pressure into the neck portion of the latex article. After 10–20 minutes, the polyvinyl alcohol form becomes flexible and elastic. The peripheral edge of the neck is slightly expanded by means of an insert 4; the form is stripped out of the article 5 by means of tongues 6. After drying and flattening, the form may be used again.

It will be obvious that numerous modifications may be made in the method above described without departing from the spirit of this invention.

In the appended claims, the term "rubber" is meant to refer to any kind of natural or synthetic rubber, and the term "rubber latex" to any aqueous dispersion or suspension of such natural or synthetic rubber, which may further contain compounding ingredients.

What I claim is:

1. A method for the manufacture of hollow rubber articles that comprises depositing rubber on a rigid former of dry, polymerized vinyl alcohol, said polymerized vinyl alcohol being polymerized to such an extent that it can be readily softened by treatment with cold water, but will not be appreciably dissolved thereby, contacting said former with cold water to destroy its rigidity, and removing the former from the rubber deposited thereon.

2. A method for the manufacture of hollow rubber articles that comprises depositing rubber on a rigid former of dry, polymerized vinyl alcohol containing less than 3 percent of acetyl groups, said polymerized vinyl alcohol being polymerized to such an extent that it can be readily softened by treatment with cold water, but will not be appreciably dissolved thereby, contacting said former with cold water to destroy its rigidity and removing the former from the rubber deposited thereon.

3. A method for the manufacture of hollow rubber articles that comprises depositing rubber on a rigid former of dry, polymerized vinyl alcohol, said polymerized vinyl alcohol being polymerized to such an extent that it can be readily softened by treatment with cold water, but will not be appreciably dissolved thereby, consolidating the deposit of rubber on the former, contacting the former with cold water to destroy its rigidity, and removing the former from the rubber deposited thereon.

4. A method for the manufacture of hollow rubber articles that comprises depositing rubber latex on a rigid former of dry, polymerized vinyl alcohol, said polymerized vinyl alcohol being polymerized to such an extent that it can be readily softened by treatment with cold water, but will not be appreciably dissolved thereby, coagulating the rubber from the latex on the former, contacting the former with cold water to destroy the rigidity, and removing the former from the rubber deposited thereon.

CHARLES SAINT-MLEUX.

REFERENCES CITED

The following references are of record in the file of this patent:

UNITED STATES PATENTS

| Number | Name | Date |
| --- | --- | --- |
| 1,554,697 | Alden | Sept. 22, 1925 |
| 1,697,438 | Wagenhorst | Jan. 1, 1929 |
| 2,001,594 | Tritt | May 14, 1935 |
| 2,198,621 | Izard | Apr. 30, 1940 |
| 2,285,502 | Dreyfus | June 9, 1942 |
| 2,345,977 | Howard et al. | Apr. 4, 1944 |